(No Model.)
J. C. GARRETSON.
Gate.
No. 240,824. Patented May 3, 1881.
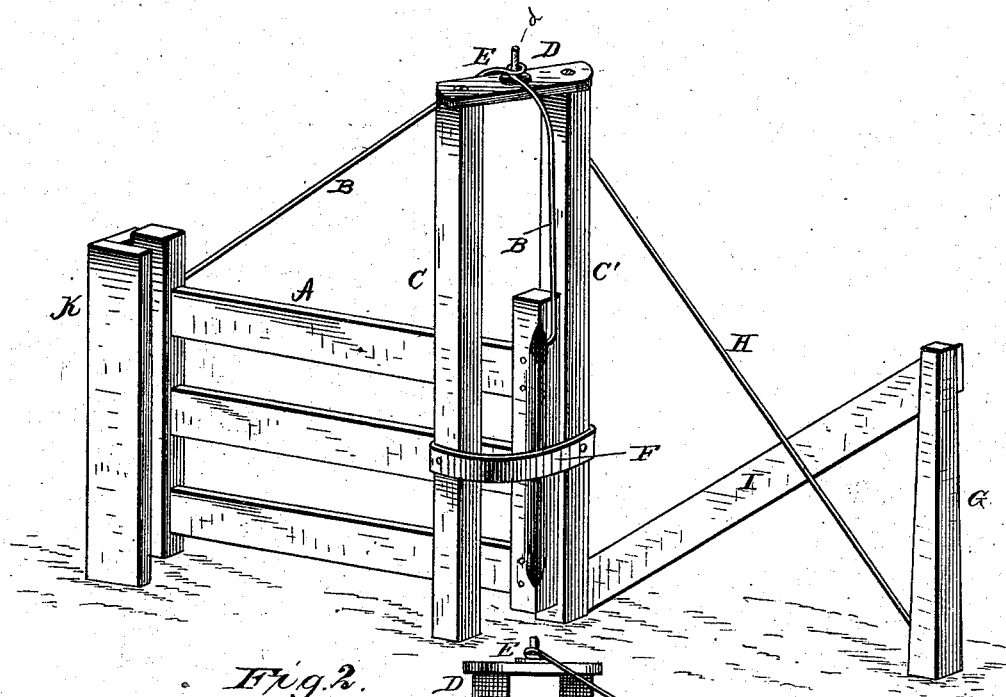
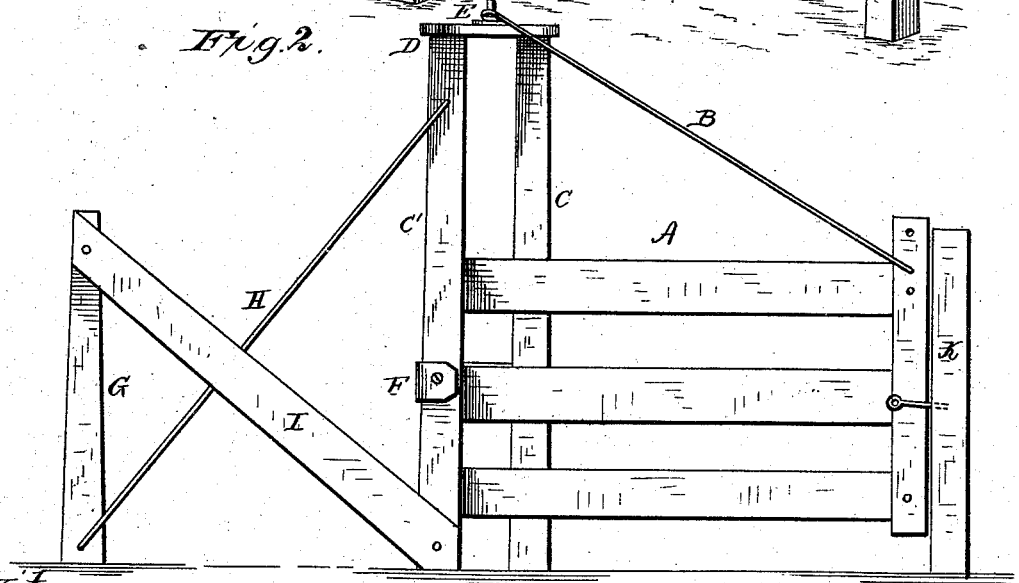
Witnesses
Franck L. Durand
Chas. L. Coombs
Inventor,
Joel C. Garretson

UNITED STATES PATENT OFFICE.

JOEL C. GARRETSON, OF SALEM, IOWA.

GATE.

SPECIFICATION forming part of Letters Patent No. 240,824, dated May 3, 1881.

Application filed April 5, 1881. (No model.)

*To all whom it may concern:*

Be it known that I, JOEL C. GARRETSON, a citizen of the United States, residing at Salem, in the county of Henry and State of Iowa, have invented certain new and useful Improvements in Gates, which I call the "Top-Suspension Gate;" and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

The object of my invention is to provide a gate that is suspended from the top ends of both front and back stiles of the gate, that the gate, by its own weight, will always incline to hold it in an upright and square position, and also to prevent the sagging so common to other forms of swinging gates, and to dispense with the use of braces in the gate, as will be more fully hereinafter set forth, and pointed out in the claims, reference being had to the drawings, in which similar letters refer to corresponding parts in the two figures, Figures 1 and 2, Fig. 1 being a perspective view, and Fig. 2 a front elevation.

A is a gate, made of any suitable material or size desired, with stiles and bars like those of the common gate. The stiles each contain two or more holes near their tops to receive the turned ends of the suspension-rod or other fastenings, the extra holes being used when it is desired to raise or lower the gate in time of frosts or snow.

B is the suspension-rod, which is attached near the top of each stile by turned ends or other fastenings, and is provided with an open coil or eye at E.

C C′ are posts, which may extend any suitable distance above the gate and just far enough apart to allow the back stile of the gate A to pass between them, and they range obliquely to the line of the gate when closed. The posts C C′ have a cap, D, securely fastened to them at their tops, containing a pin, d, near its middle, to fasten and hold the suspension-rod in position when the coil E is placed around it. Suspension-rod B has an open coil or eye at E, where it passes over cap D to receive pin d, which holds the rod in position, and around which the open coil or eye moves when the gate A is opened or closed.

F is a semicircular slide, made of strap-iron or other suitable material, of any width or strength desired, and is fastened in the rear of the gate A to both posts, C C′, at about half the height of the gate A, against which the back stile rests when the gate is either closed or open, and against which it slides while the gate A is being opened or closed, and prevents the rearward inclination of the gate.

G is a stay-post in the rear of the gate.

H is a stay-rod extending from the bottom of post G to the top of post C′, holding the latter in position.

I is a brace fastened at the bottom of post C′ and to the top of post G, holding post G in a vertical position.

K is an ordinary latch-post, to which the gate A may be fastened by a pin or latch.

It will be seen that by the use of suspension-rod B, as arranged and connected to the top of both stiles of gate A, it is suspended from the top, and by the use of pin d in cap D, in connection with rod B and with slide F, the gate A will always maintain an upright and square position without the use of braces in the gate, and swing open and shut easily and squarely.

Having thus described my invention, what I claim as new, and desire to secure by Letters Patent, is—

1. The suspension-rod B, as arranged and combined with the top of both stiles of gate A, to suspend the gate from the top, substantially as set forth and described.

2. The pin d in cap D, and suspension-rod B, combined with slide F to hold the gate A in an upright and square position, and allow it to swing freely and squarely in opening and closing, as set forth and described.

In testimony whereof I affix my signature in presence of two witnesses.

JOEL C. GARRETSON.

Witnesses:
 S. S. KIRK,
 S. D. WILLIAMSON.